(12) United States Patent
Ng et al.

(10) Patent No.: US 11,381,444 B2
(45) Date of Patent: Jul. 5, 2022

(54) METHOD AND APPARATUS FOR COHERENT TRANSMITTER CALIBRATION

(71) Applicants: Wing Chau Ng, Kanata (CA); Xuefeng Tang, Ottawa (CA); Zhuhong Zhang, Ottawa (CA)

(72) Inventors: Wing Chau Ng, Kanata (CA); Xuefeng Tang, Ottawa (CA); Zhuhong Zhang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/037,840

(22) Filed: Sep. 30, 2020

(65) Prior Publication Data
US 2021/0119850 A1 Apr. 22, 2021

Related U.S. Application Data

(60) Provisional application No. 62/923,803, filed on Oct. 21, 2019.

(51) Int. Cl.
| | |
|---|---|
| H04B 10/50 | (2013.01) |
| H04B 10/077 | (2013.01) |
| H04L 27/36 | (2006.01) |
| H04L 27/227 | (2006.01) |
| H04L 27/04 | (2006.01) |

(52) U.S. Cl.
CPC ......... *H04L 27/364* (2013.01); *H04B 10/077* (2013.01); *H04B 10/5057* (2013.01); *H04L 27/04* (2013.01); *H04L 27/227* (2013.01)

(58) Field of Classification Search
CPC ... H04B 10/077; H04B 10/5057; H04L 27/04; H04L 27/227; H04L 27/364
See application file for complete search history.

(56) References Cited

U.S. PATENT DOCUMENTS 9,374,171 B2 * 6/2016 Randel ............... H04B 10/5165
9,819,412 B1 11/2017 Shankar et al.
(Continued)

FOREIGN PATENT DOCUMENTS

CN 102422571 A 4/2012

OTHER PUBLICATIONS

E. C. Ju, X. Chen, N. Liu and L. Wang, "SSII cancellation in 40Gbps VSB-IMDD OFDM system based on symbol pre-distortion," 2014 The European Conference on Optical Communication (ECOC), 2014, pp. 1-3, doi: 10.1109/ECOC.2014.6963941. (Year: 2014).*
(Continued)

*Primary Examiner* — Nathan M Cors (57) ABSTRACT

Methods and apparatus for coherent transmitter calibration are provided that employ direct detection (DD) using one single photodetector (PD). The provided method and apparatus do not require hardware for coherent reception, or additional ADCs for quality control. An additional optical tone is added to a QAM optical signal that is outside the band of the QAM optical signal. The result of this is that after direct detection, there is a correlation between the real and imaginary parts, and the imaginary part can be recovered with a Hilbert transform. The estimated QAM optical signal obtained by direct detection is used to perform a transmitter factory calibration method to calibrate for one or more transmitter impairments and/or to perform in-line self-calibration.

20 Claims, 8 Drawing Sheets

(56) References Cited

U.S. PATENT DOCUMENTS

| | | | | |
|---|---|---|---|---|
| 9,991,953 | B1* | 6/2018 | Fludger | H04B 10/5057 |
| 2014/0023368 | A1* | 1/2014 | Bhandare | H04J 14/06 |
| | | | | 398/65 |
| 2016/0212003 | A1* | 7/2016 | Chen | H04B 10/6971 |
| 2017/0324476 | A1 | 11/2017 | Bravi | |
| 2018/0323871 | A1 | 11/2018 | Fan et al. | |
| 2020/0028592 | A1* | 1/2020 | Chen | H04B 10/60 |

OTHER PUBLICATIONS

Yue, Yang et al., IQ Skew Monitoring and Alignment of Optical Quadrature Amplitude Transmitter using Reconfigurable Interference, CLEO: 2014, OSA Technical Digest (online) (Optical Society of America, 2014), paper SW3J.6. https://www.osapublishing.org/abstract.cfm?URI=CLEO_SI-2014-SW3J.6.

Diniz, Julio Cesar Medeiros et al., "Time Skew Estimator for Dual-Polarization QAM Transmitters", European Conference on Optical Communication (2017), paper P1.SC3.41.

Chen, Hao et al., "In-phase/Quadrature Skew Measurement for Optical Mach-Zehnder Modulator", NUSOD, 2016, Copenhagen, Denmark, Jul. 24-28, 2017.

Fludger, C.R.S et al., "Low Cost Transmitter Self-Calibration of Time Delay and Frequency Response for High Baud-Rate QAM Transceivers", Optical Fiber Communication Conference OSA Technical Digest (online) (Optical Society of America, 2017), paper Th1D.3, https://doi.org/10.1364/OFC.2017.Th1D.3.

Skvortcov, Pavel et al., "Transmitter IQ skew calibration in coherent transceivers based on DSP", Advanced Photonics 2018 (BGPP, IPR, NP, NOMA, Sensors, Networks, SPPCom, SOF) OSA Technical Digest (online) (Optical Society of America, 2018), paper SpW1G.6 • https://doi.org/10.1364/SPPCOM.2018.SpW1G.6.

Khanna, Ginni et al., "Accurate Estimation of Transmitter I/Q Skew for High-Rate Spectrally Efficient Optical Transponders", Conference: 2018 European Conference on Optical Communication (ECOC).

Skvortcov, Pavel et al., "Joint Tx and Rx skew calibration in coherent transceivers based on Rx-side DSP", 2018 IEEE Photonics Conference (IPC).

* cited by examiner

METHOD AND APPARATUS FOR COHERENT TRANSMITTER CALIBRATION

RELATED APPLICATION

The application claims the benefit of prior U.S. provisional application No. 62/923,803 filed 21 Oct. 2019, which is hereby incorporated by reference in its entirety.

FIELD

The application relates to methods and apparatus for coherent transmitter calibration.

BACKGROUND

The performance of a high-baud coherent signal degrades because of the timing misalignment (skew) between the in-phase (I) and quadrature (Q) tributaries of the IQ modulator at the transmitter (Tx).

The skew of an IQ modulator should be measured and compensated during factory calibration or through Tx self-calibration after the equipment is deployed in the field. Various approaches to skew measurement have been proposed.

Some existing approaches to transmitter calibration use a coherent receiver and two analog to digital converters (ADCs). This approach introduces extra skew and a different device response both of which affects the measurement accuracy. In addition, the inclusion of a coherent receiver introduces extra cost. Finally, the receiver (Rx) DSP may not calibrate correctly because Tx and Rx skews cannot be separated in the absence of frequency offset.

Some existing approaches to transmitter calibration use a single low bandwidth photodetector and a low speed ADC. With this approach, there is a need to change the working condition (IQ phase bias) of the IQ modulator, manually or automatically using special algorithms. I and Q bias points will be affected when changing phase bias. It takes time to stabilize at a new bias point, and extra radio frequency (RF) electronics are required.

Some existing approaches to transmitter calibration use a single large bandwidth photodetector and a high speed ADC. However, with such approaches, the detection of the power of the image spectrum is affected by the IQ phase error, degrading the accuracy, and therefore requiring the use of special algorithms.

SUMMARY

Methods and apparatus for coherent transmitter calibration are provided that employ direct detection (DD) using one single photodetector (PD), one ADC and one tunable laser source. The provided method and apparatus do not require hardware for coherent reception, or additional ADCs for quality control. The provided methods and apparatus, in some embodiments, can be used to determine transmitter impairment such as S21 parameter, IQ skew, polarization skew for a single carrier system, and additionally, channel skew in a superchannel system (multiple optical carrier system). In addition, in some embodiments, the provided methods and apparatus are used to perform factory calibration or transmitter self-calibration. An additional optical tone is added to a quadrature amplitude modulation (QAM) optical signal that is outside the band of the QAM optical signal. The result of this is that after direct detection, there is a correlation between the real and imaginary parts, and the imaginary part can be recovered with a Hilbert transform so that the coherent signal can be reconstructed.

According to one aspect of the present disclosure, there is provided a method of detecting a coherent QAM optical signal produced by an IQ modulator comprising: adding an optical frequency tone to the coherent QAM optical signal, the tone having a carrier frequency outside a bandwidth of the coherent QAM optical signal to produce a coherent QAM optical signal with added optical frequency tone; performing photodetection on the coherent QAM optical signal with added optical frequency tone with a single photodetector to produce a photodetector output containing a DC term, a signal beat term, and an signal-signal beat interference (SSBI) term.

The photodetector output can be processed to produce an estimate of the coherent QAM optical signal, e.g. an estimate of the QAM constellation, and based on this, an estimate of transmitter impairment can be determined based on the estimate.

Optionally, the method further comprises: estimating skew introduced by the IQ modulator (or more generally the transmitter) based on the estimate of the coherent QAM optical signal and an input signal to the IQ modulator.

Optionally, the method further comprises: determining whether or not to discard the IQ modulator based on whether the estimated skew is above a threshold during factory calibration.

Optionally, the method further comprises: configuring a transmitter containing the IQ modulator with a parameter representative of the estimated skew.

Optionally, the method further comprises: performing IQ quadrature phase error measurement based on photodetector output.

Optionally, the method further comprises: estimating an overall transmitter frequency response (S21) based on the photodetector output.

Optionally, the method further comprises: performing XY skew (skew between the modulators at X-polarization and at Y-polarization) calibration based on the photodetector output.

Optionally, the method further comprises: performing channel skew (skew between channels in a superchannel system) calibration based on the photodetector output.

Optionally, the method further comprises: performing in-line transmitter impairment monitoring and compensation based on the photodetector output.

Optionally, the method further comprises: performing digital pre-distortion based on the photodetector output.

Optionally, processing the photodetector output to produce an estimate of the coherent QAM optical signal comprises: performing analog to digital conversion to digitize the photodetector output; performing DC removal to remove the DC term to produce a real output of DC removal; performing a frequency domain (FD) Hilbert transform on the real output of DC removal to obtain a corresponding imaginary component; generating a complex value having a real component equal to the real output of DC removal, and having an imaginary component equal to the corresponding imaginary component obtained via the FD Hilbert transform; applying a frequency shift that is a reverse of a difference between the carrier frequency of the optical frequency tone and a carrier frequency of the signal.

Optionally, processing the photodetector output to produce an estimate of the coherent QAM optical signal further comprises: after applying the frequency shift, performing filtering to remove frequency components substantially outside the input signal bandwidth to the IQ modulator; performing data synchronization.

Once an estimate of the coherent QAM optical signal is obtained, this can be used as a basis for performing transmitter calibration, for example to perform signal processing to remove an optical impairment and/or signal processing to remove an electrical impairment.

According to another aspect of the present disclosure, there is provided an apparatus for detecting a coherent QAM optical signal produced by an IQ modulator, the apparatus comprising: a laser source for generating an optical frequency tone having a carrier frequency outside a bandwidth of the coherent QAM optical signal; a combiner for adding the optical frequency tone to the coherent QAM signal, to produce a coherent QAM optical signal with added optical frequency tone; and a single photodetector for performing photodetection on the coherent QAM optical signal with added optical frequency tone to produce a photodetector output containing a DC term, a signal beat term, and an signal-signal beat interference (SSBI) term.

Optionally, the DSP is further configured to estimate skew introduced by the IQ modulator based on the digitized photodetector output and an input signal to the modulator. This can be used for transmitter calibration.

Optionally, the apparatus is further configured to: perform IQ quadrature phase error measurement based on photodetector output.

Optionally, the apparatus is further configured to: estimate an overall transmitter frequency response based on the photodetector output.

Optionally, the apparatus is further configured to: perform XY skew calibration based on the photodetector output.

Optionally, the apparatus is further configured to: perform channel skew calibration (in a superchannel system) based on the photodetector output.

Optionally, the apparatus is further configured to: perform in-line transmitter impairment monitoring and compensation based on the photodetector output.

Optionally, the apparatus is further configured to: performing digital pre-distortion based on the photodetector output.

Optionally, the DSP is configured to process the photodetector output to produce the estimate of the coherent QAM optical signal by: performing DC removal to remove the DC term to produce an output of DC removal; performing a frequency domain (FD) Hilbert transform on the output of DC removal to obtain a corresponding imaginary component; reconstructing a complex signal having a real component equal to the output of DC removal and having an imaginary component equal to the corresponding imaginary component; applying a frequency shift that is a reverse of a difference between the frequency of the optical frequency tone and the carrier frequency of the signal.

Optionally, the DSP is further configured to process the photodetector output to produce the estimate of the coherent QAM optical signal by: after applying the frequency shift, performing filtering to remove components substantially out of the QAM signal spectrum; performing data synchronization.

According to one aspect of the present disclosure, there is provided a method of calibrating a coherent transmitter, the method comprising: adding an optical frequency tone to a coherent QAM optical signal, the tone having a carrier frequency outside a bandwidth of the coherent QAM optical signal to produce a coherent QAM optical signal with added optical frequency tone, such that there is a gap between the bandwidth of the coherent QAM optical signal and the frequency of the optical frequency tone; performing photodetection on the coherent QAM optical signal with added optical frequency tone with a single photodetector to produce a photodetector output containing a DC term, a signal beat term, and a signal-signal beat interference (SSBI) term; calibrating the transmitter based on the photodetector output.

In some embodiments, calibrating the transmitter output based on the photodetector output comprises: for a single channel optical signal, calibrating for one or a combination of the following transmitter impairments; an overall transmitter frequency response; or IQ skew; or XY polarization skew; or for a superchannel system calibrating one or a combination of the following transmitter impairments: an overall frequency response; or IQ skew; or XY polarization skew; or delay between adjacent channels.

In some embodiments, the method further comprises: processing the photodetector output to produce an estimate of a coherent QAM signal constellation from the photodetector output.

In some embodiments, the method further comprises: processing the photodetector output to produce an estimate of the one or a combination of transmitter impairments.

In some embodiments, calibrating the transmitter comprises: determining whether or not to discard an IQ modulator forming part of the transmitter based on whether the estimated skew is above a threshold.

In some embodiments, calibrating the transmitter comprises: calibrating the transmitter based on the estimate of the one or a combination of transmitter impairments.

In some embodiments, the method further comprises: performing in-line transmitter impairment monitoring and compensation based on the photodetector output.

In some embodiments, the method further comprises: performing digital pre-distortion based on the photodetector output.

In some embodiments, processing the photodetector output to produce an estimate of the coherent QAM optical signal constellation comprises: performing analog to digital conversion to digitize the photodetector output; performing DC removal to remove the DC term to produce a real output of DC removal; performing a frequency domain (FD) Hilbert transform on the real output of DC removal to obtain a corresponding imaginary component; generating a complex value having a real component equal to the real output of DC removal, and an imaginary component equal to the corresponding imaginary component obtained by the FD Hilbert transform; applying a frequency shift that is a reverse of a difference between the carrier frequency of the optical frequency tone and a carrier frequency of the signal.

In some embodiments, processing the photodetector output to produce an estimate of the coherent QAM optical signal constellation further comprises: after applying the frequency shift, performing filtering to remove frequency components outside the bandwidth of an input signal to an IQ modulator forming part of the transmitter; performing data synchronization.

In some embodiments, processing the photodetector output to produce an estimate of the coherent QAM optical signal constellation further comprises one or both of: signal processing to remove an optical impairment;

signal processing to remove an electrical impairment.

According to another aspect of the present disclosure, there is provide an apparatus for calibrating a transmitter that has an IQ modulator that produces a coherent QAM optical signal, the apparatus comprising: a laser source for generating an optical frequency tone having a carrier frequency outside a bandwidth of the coherent QAM optical signal, such that there is a gap between the bandwidth of the coherent QAM optical signal and the frequency of the optical frequency tone; a combiner for adding the optical frequency tone to the coherent QAM optical signal, to produce a coherent QAM optical signal with added optical frequency tone; and a single photodetector for performing photodetection on the coherent QAM optical signal with added optical frequency tone to produce a photodetector output containing a DC term, a signal beat term, and a signal-signal beat interference (SSBI) term; a digital signal processor (DSP) configured to calibrate the transmitter based on the photodetector output.

In some embodiments, the DSP is configured to calibrate the transmitter output based on the photodetector output by: for a single channel optical signal, calibrating for one or a combination of the following transmitter impairments: an overall transmitter frequency response; or IQ skew; or XY polarization skew; or for a superchannel system calibrating one or a combination of the following transmitter impairments: an overall frequency response; or IQ skew; or XY polarization skew; or delay between adjacent channels.

In some embodiments, the apparatus is further configured to: process the photodetector output to produce an estimate of a coherent QAM signal constellation from the photodetector output.

In some embodiments, the apparatus is further configured to: processing the photodetector output to produce an estimate of the one or a combination of transmitter impairments.

In some embodiments, the apparatus is further configured to calibrating the transmitter by: determining whether or not to discard an IQ modulator forming part of the transmitter based on whether the estimated skew is above a threshold.

In some embodiments, the apparatus is further configured to calibrate the transmitter by: calibrating the transmitter based on the estimate of the one or a combination of transmitter impairments.

In some embodiments, the apparatus is further configured to: perform in-line transmitter impairment monitoring and compensation based on the photodetector output.

In some embodiments, the apparatus is further configured to: perform digital pre-distortion based on the photodetector output.

In some embodiments, the apparatus is further configured to process the photodetector output to produce an estimate of the coherent QAM optical signal constellation by: performing analog to digital conversion to digitize the photodetector output; performing DC removal to remove the DC term to produce a real output of DC removal; performing a frequency domain (FD) Hilbert transform on the real output of DC removal to obtain a corresponding imaginary component; generating a complex value having a real component equal to the real output of DC removal, and an imaginary component equal to the corresponding imaginary component obtained by the FD Hilbert transform; applying a frequency shift that is a reverse of a difference between the carrier frequency of the optical frequency tone and a carrier frequency of the signal.

In some embodiments, the apparatus is further configured to process the photodetector output to produce an estimate of the coherent QAM optical signal constellation by: after applying the frequency shift, performing filtering to remove frequency components outside the bandwidth of an input signal to an IQ modulator forming part of the transmitter; performing data synchronization.

In some embodiments, the apparatus is further configured to process the photodetector output to produce an estimate of the coherent QAM optical signal constellation further by one or both of: signal processing to remove an optical impairment; signal processing to remove an electrical impairment.

BRIEF DESCRIPTION OF THE DRAWINGS

Embodiments of the disclosure will now be described with reference to the attached drawings in which.

DETAILED DESCRIPTION

The operation of the current example embodiments and the structure thereof are discussed in detail below. It should be appreciated, however, that the present disclosure provides many applicable inventive concepts that can be embodied in any of a wide variety of specific contexts. The specific embodiments discussed are merely illustrative of specific structures of the disclosure and ways to operate the disclosure, and do not limit the scope of the present disclosure.

Methods and apparatus for coherent transmitter calibration are provided that employ direct detection (DD) using one single photodetector (PD), one ADC and one tunable laser source. The provided method and apparatus do not require hardware for coherent reception, or additional ADCs for quality control. These can be used to determine transmitter impairments such as S21 parameter (overall frequency response), IQ skew, polarization skew for a single carrier system, and additionally, channel skew in a superchannel system (multiple optical carrier system), and can be used to perform factory calibration or self-calibration of transmitter.

The method can be used to perform a factory calibration or transmitter self-calibration for a transmitter impairment. The method involves recovering the coherent signal constellation using only one wideband photodetector and one high speed ADC and one tunable laser source, followed by standard coherent digital signal processing algorithms, for example in a slow rate DSP processor.

Direct detection does not normally recover a coherent QAM signal because phase information is lost during the squaring operation upon intensity detection. However, it is possible to reconstruct a complex field from a photocurrent output of direct detection using a frequency domain (FD)-Hilbert transform in the case that the real and the imaginary parts of the signals are correlated. In the provided method and apparatus, the QAM signal is combined with an additional optical frequency tone with a frequency shift (relative to the QAM signal) that is larger than half of the symbol rate. As will be explained in detail below, this introduces correlation between the real and imaginary parts, such that the Hilbert transform can be used to recover the imaginary part, from the real-valued photodetector output.

Figure 1A:
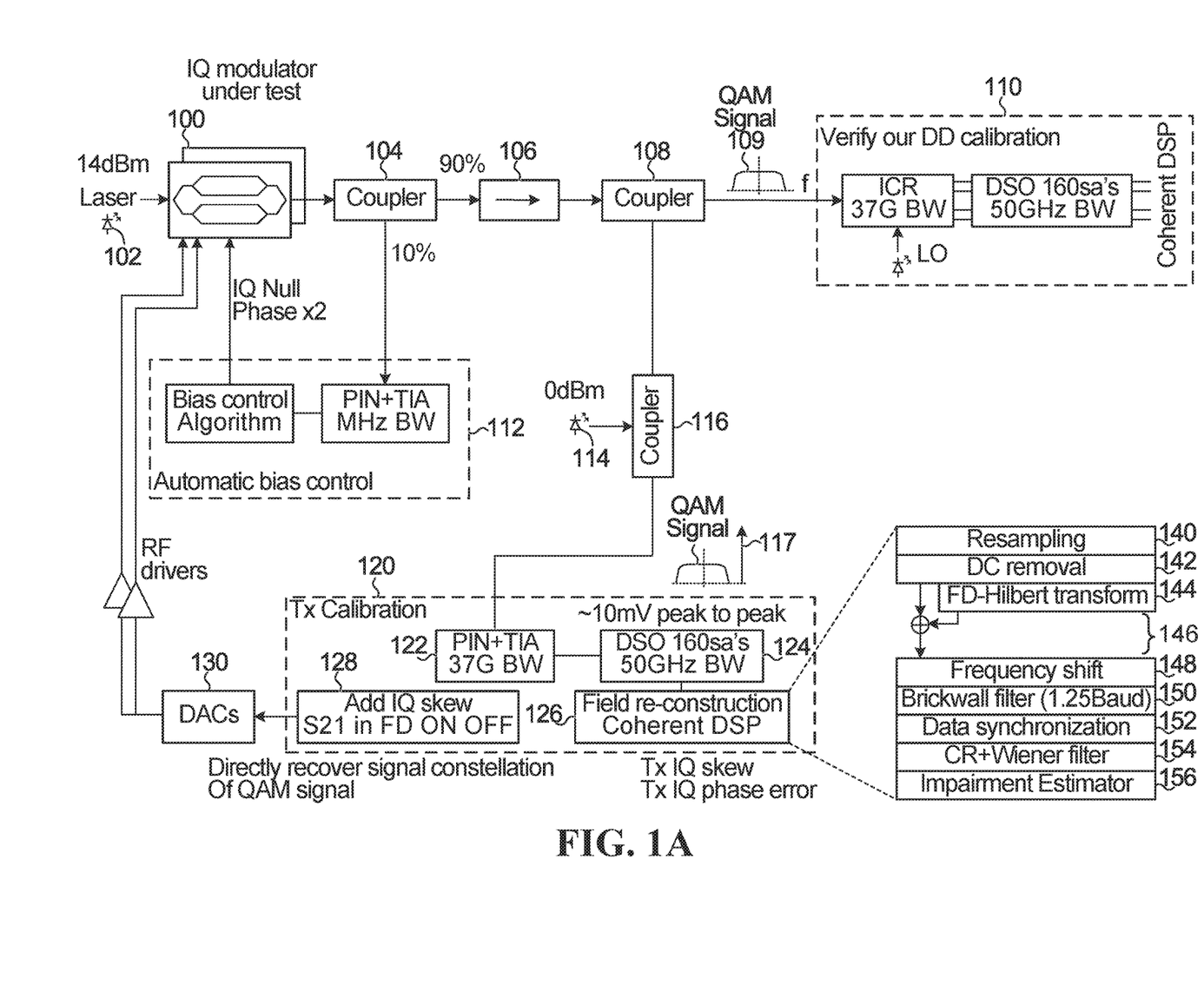
FIG. 1A is a schematic of an apparatus for performing coherent detection, and transmitter calibration.

Referring now to FIG. 1A, shown is a schematic diagram of an apparatus for coherent transmitter calibration provided by an embodiment of the disclosure. The apparatus of FIG. 1A corresponds to a test apparatus used to implement and test the provided system and method. It should be understood the application is not limited to the embodiment of FIG. 1A. More general embodiments are provided in FIGS. 2A and 2B described below. An IQ modulator under test/to be calibrated is indicated at 100. Laser 102 produces an input to the IQ modulator under test. In a specific example, the laser is a 1548.3 nm laser. The output of the IQ modulator 100 passes through a first coupler 104, optical isolator 106, and a second coupler 108 to an optional verification block 110. Coupler 104 passes a small component of the signal to an automatic bias control block 112. The apparatus includes a feedback architecture for coherent transmitter calibration that includes: Coupler 108 passes a small portion of the signal to another coupler 116. Coupler 116 also has an input from another laser source 114, more generally, a source that produces an optical frequency tone. In a specific example, the tone is at 0 dBm. The output of coupler 116 is processed in Tx calibration block 120 to identify one or more transmitter impairments and/or to generate one or more calibration outputs. Finally, the signal from block 120 is fed to the digital-to-analog converters (DACs) 130 to adjust or compensate the transmitter impairment.

The Tx calibration block 120 has a single wideband photodetector 122. The output of the photodetector 122 is passed to a ADC block 124 which in turn is connected to a field re-construction coherent DSP 126. The functionality of the Tx calibration block 120 is illustrated to the right of FIG. 1A, and includes the following sub-blocks/steps which can be performed offline, for example in a slow-rate processor (much slower than the processing rate for real time processing, for example an application specific integrated circuit (ASIC) rate or an ASIC-DSP rate used for real-time processing to transmit and receive data):
  Resampling 140;
  DC removal 142;
  FD-Hilbert Transform 144;
  Producing complex value 146;
  Frequency shift 148;
  Brickwall filter 150;
  Data synchronization 152;
  CR+ Wiener filter 154; and
    (transmitter impairment estimator such as IQ skew, S21, XY skew, polarization skew, channel skew etc.) 156.

In operation, the spectrum of the signal that is output by coupler 108, and passed on to verification block 110 (or more generally, to a destination of signal transmission) is indicated at 109. Part of the output optical signal from the IQ modulator 100 is passed by the coupler 104 to the automatic bias control block 112 which performs automatic bias control. This bias control is an optional feature that is not related to the provided calibration method. Part of the output optical signal is passed by coupler 108 to coupler 116 where it is combined with the output of the laser source 114. In a specific example of transmitter calibration using 34 GBaud 16-QAM, the part of the output optical signal has power of about −15 dBm while the power from the laser source 114 is about −0 dBm. Notably, the power of the laser source 114 is significantly greater than the power of the signal at the point where they are combined. The frequency of the laser source 114 is located outside the bandwidth of the output optical signal. In a specific example, the optical output signal from the IQ modulator 100 has a bandwidth from −17 GHz to +17 GHz around its center frequency. In a specific example, the frequency of the laser source 114 is spaced from the center frequency of the signal carrier, for example by roughly 20 GHz, which provides a 3 GHz gap between the bandwidth of the signal and the optical carrier from laser source 114. The optical frequency tone may be above (>17 GHz) or below (<−17 GHz) the signal carrier in frequency. Note that for self-homodyne, the original laser 102 can be reused via optical coupling in place of laser source 114, which helps further reduce the extra cost of the system. The signal spectrum after combining with the signal from laser source 114 is indicated at 117. For the purpose of this example, the following notation is used:

Inputs to IQ modulation: let data on the I path be C and data on the Q path be D.
  Signal from laser source 114: $Ae^{j2\pi Ft}$
  Component of Signal under test: $B=\hat{C}+j\hat{D}$
  Output of coupler 116: $Ae^{j2\pi Ft}+B$
  Referring to FIG. 1B, where $B=E_{sig}$, $F=\Delta f$, the spectrum before detection, but after adding the optical tone is indicated at 150.

The output of the coupler 116 is detected by the wideband photodetector 122. In the example illustrated this is a 37 GHz bandwidth photodetector. The output of PD 122 can be expressed as:

$$|Ae^{j2\pi Ft}+B|^2=|A|^2+|B|^2+2\mathrm{Re}\{A^*e^{j2\pi Ft}B\}.$$

Figure 1B:
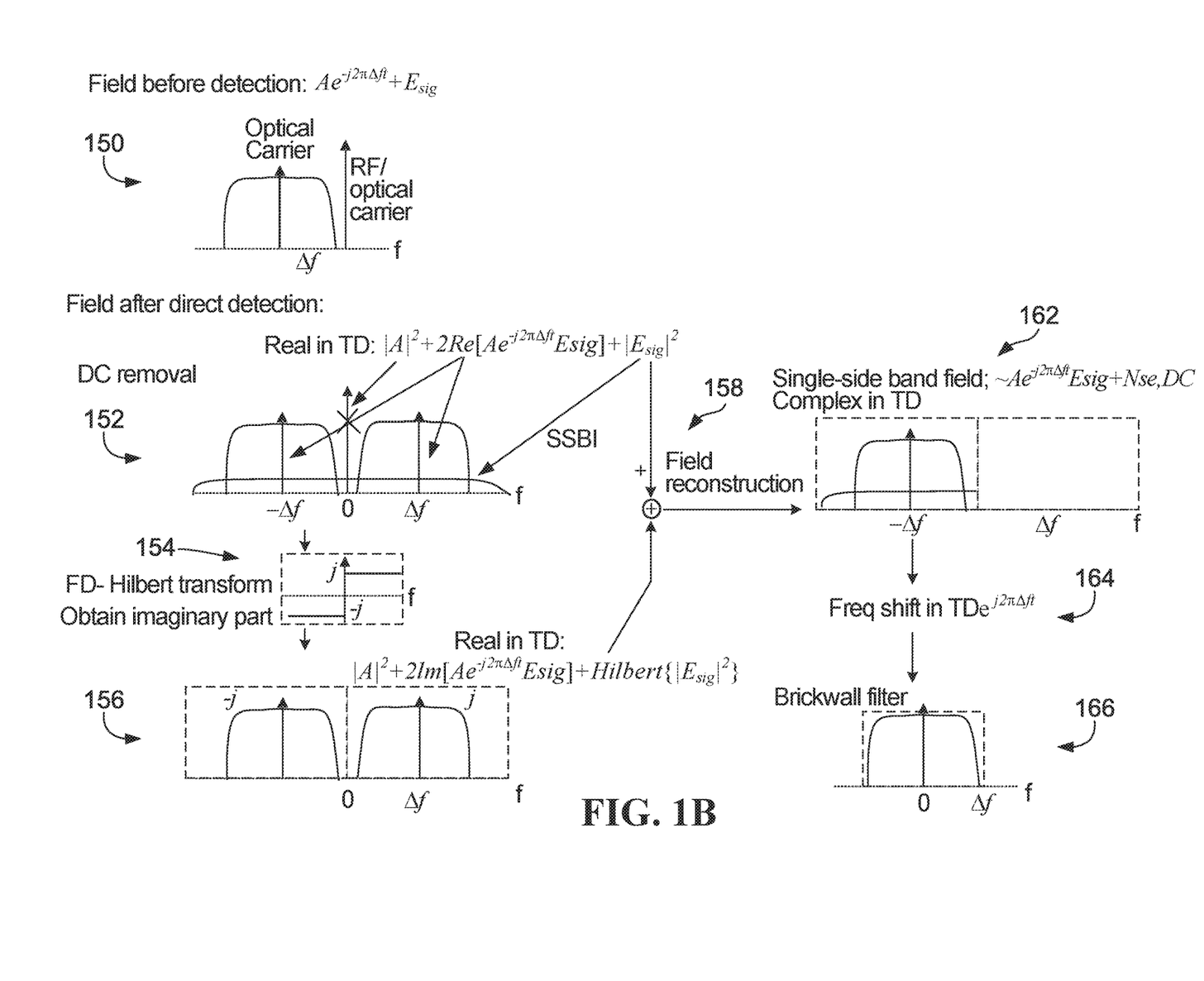
FIG. 1B shows a frequency spectrum after various steps performed using the apparatus of FIG. 1A.

Referring to FIG. 1B, the output of direct detection is indicated at 152. This also shows the field after DC removal, described below.

The output of the photodetector 122 is sampled by the ADC 124, which in the illustrated example is a digital sampling oscilloscope (DSO) configured to sample at 160 Gsa/s. The output of the ADC 124 is a digitized PD output. It is noted that the PD output and the digitized PD output (sampled version) each contain a DC term ($|A|^2$), a laser-signal beat term ($2\mathrm{Re}\{A^*e^{-j2\pi Ft}B\}$) and a signal-signal beat interference (SSBI) term ($|B|^2$). Because of the absence of transmission impairment (e.g. amplifier noise), the constellation is still clear without SSBI cancelation, greatly simplifying the algorithm design.

This signal is then processed by the field re-construction coherent DSP 126. For offline processing, the digitalized PD output was first resampled in resampler 140, in this example to 8 samples per symbol, by interpolating between the samples of the digitized PD output.

DC remover 142 removes the DC term. The output of DC remover can be expressed as:

$$|B|^2+2\mathrm{Re}\{A^*e^{-j2\pi Ft}B\}$$

Note that as described above, the additional laser signal power is much greater the signal power, i.e. $|A|\gg|B|$, so $|B|^2$ can be approximated as 0, such that the output of DC removal can be approximated as $2\mathrm{Re}\{A^*e^{-j2\pi Ft}B\}$. The expression includes a factor 2A that is a known constant that can be removed/ignored, such that the output of DC removal can be expressed as $$\mathrm{Re}\{e^{-j2\pi Ft}B\}=\mathrm{Re}(G)=\mathrm{Re}\{e^{-j2\pi Ft}(\hat{C}+j\hat{D})\}=\mathrm{Re}(G)$$

Due to the presence of the correlation between the real and imaginary parts of G, a Hilbert transform can be used to recover the imaginary part of G. Applying a Hilbert transform 144 to $\mathrm{Re}\{G\}$ yields $\mathrm{Im}\{G\}$.

Referring again to FIG. 1B, the frequency domain Hilbert transform is indicated at 154, and the output of the frequency domain Hilbert transform is indicated at 156. In a field reconstruction step, the output of the Hilbert transform 144 (Im{G}) is multiplied by j and combined with the real part of G (output of DC removal=Re{G}) in produce complex value block 146 to produce:

$$G=Re\{G\}+j(\text{Im}(G))=e^{-j2\pi Ft}(\hat{C}+j\hat{D})$$

Referring to FIG. 1B, the field reconstruction is indicated at 158, and the resulting spectrum is indicated at 162.

This is a bandpass 16QAM signal with a frequency offset of around 20 GHz (or more generally whatever the frequency gap between the additional laser 114 and the laser frequency of the signal 102). The frequency offset (F) was estimated, for example by the well-known maximization of the 4th power of signal spectrum. The frequency offset was cancelled in the frequency shifter 148 (by shifting by the negative of the frequency offset) to generate a baseband 16QAM signal according to:

$$G\cdot e^{j2\pi Ft}=e^{j2\pi Ft}e^{-j2\pi Ft}(\hat{C}+j\hat{D})=\hat{C}+j\hat{D}$$

Referring to FIG. 1B, the frequency shift is shown at 164, and the spectrum of the signal after the frequency shift (and brickwall filtering) is indicated at 166.

Additional processing may optionally be performed following the frequency shifter 148 to improve the quality of the signal. In the illustrated example, these components include brickwall filter 150, for example set to 1.25×Baud rate, used to bandwidth suppress the out-of-band spectral residuals (SSBI and tones), and carrier recovery (CR)+ Wiener filter 154.

Data synchronizer 152 performs data synchronization to identify a time shift between the output of the filter 150 and the original signal, so that a proper comparison is possible.

Up to this point, a field (a complex quantity) is obtained, but this is distorted because of optical and electrical impairments. Carrier recovery (CR) is an example of a component that can address the optical impairments. Wiener filter 154 is another example of a tool to improve the signal quality or to estimate the transmitter impairment. Adaptive filtering can be used as well.

Optical impairments: Each laser will have phase noise (random phase rotation): for example, the frequency, F, in $Ae^{j2\pi Ft}$ is not a constant, but behaves like F+dF where dF is a random quantity. Since the added carrier (from laser 114) and the signal carrier (from laser 102) are two separate components, carrier recovery is performed by performing phase estimation and then compensation.

Electrical impairments: in the illustrated example, a Wiener filter is used for compensating the distortion due to the hardware components. For example, the RF drivers, RF cables connected to the IQ modulator, and IQ modulator are not ideal; their bandwidth is not flat, causing distortion. Wiener filtering involves estimating the coefficients of a filter (estimated by Wiener-Hopf equation), and then performing filtering on the signal in order to compensate the distortion. This Wiener Hopf equation requires a reference signal (true signal), which is actually what was transmitted. Similarly, other types of adaptive filtering may be used. The filter serves as an equalizer; its coefficients also contain the information of the transmitter impairment that are used to calculate the transmitter impairment such as IQ skew, S21, XY skew, etc.

It can be seen that as a result of using the system of FIG. 1A, the coherent QAM signal is recovered from a single-channel PD output without the need for a coherent receiver.

Assuming that the original signal at the inputs to the IQ modulator are C and D, the recovered 16 QAM signal is $R=\hat{C}+j\hat{D}$, the skew can be estimated using conventional methods. For example, this may involve comparing the recovered signal with the reference signal to see the relative delay between I and Q signals. In addition, the quadrature phase error can be estimated by the inner product of in the phase and quadrature components, while the IQ skew can be estimated via filter tap values. $\hat{R}=\hat{C}+j\hat{D}$ is the ideal signal assuming no quadrature phase error.

Quadrature phase error is zero when $\hat{C}$ and $\hat{D}$ are orthogonal. j in the expression $\hat{C}+j\hat{D}$, which equals $e^{j\pi/2}$ in the absence of quadrature phase error, becomes $e^{j\pi/2+jErr}=je^{jErr}$ in the presence of a quadrature phase error Err.

Let $\hat{R}$ be the signal without phase error, and let $\hat{R}'$ be the signal with phase error. For the signal with no phase error:

$$\hat{R}=\hat{C}+j\hat{D};\text{ and}$$

$$\hat{C}=Re(\hat{R}'),\hat{D}=\text{Im}(\hat{R}')$$

In this case, $\hat{C}$ and $\hat{D}$ are uncorrelated. However, in the presence of phase error:

$$\hat{R}'=\hat{C}+je^{jErr}\hat{D};\text{ and}$$

$$\hat{C}=Re(\hat{R}'),\hat{D}=\text{Im}(\hat{R}')$$

In this case, $\hat{C}$ and $\hat{D}$ are correlated. The phase error (angle) can be found using the inner product.

Optionally, for self-calibration of the transmitter, once the skew has been measured, Tx calibration block 120 applies a calibration to the IQ modulator. In some embodiments, this is performed each time the transmitter equipment is powered up, because the transmitter condition may change over time. FIG. 1A shows optional components 110 for verifying the calibration was successful. Note that, unlike self-calibration, factory calibration does not necessarily mean compensating for the skew of the IQ modulator (or more generally compensating the transmitter), which is typically fixed after manufacture. For quality control, if the skew is very very large, for example larger than a defined discard threshold, the IQ modulator (or more generally the transmitter) can be declared faulty and discarded. The discard threshold may be set on an application specific basis, and may, for example, depend on product speed. A very specific example is 50 ps.

In some embodiments, if the IQ skew is larger than a defined threshold (but optionally less than a discard threshold), for example 2 ps, the IQ skew is provided as a parameter to be inputted into the software of the transmitter. In this case, the IQ modulator under test can be included in the transmitter rather than discarded. An algorithm in the transmitter will obtain this parameter, and then add skew on either I or Q, when the transmitter is operational. The added skew has the same magnitude, but the opposite sign as the determined skew for the purpose of skew compensation.

Also shown is an optional component 128 for adding IQ skew into the signal. This can be also used to test the validity of the Tx calibration. The desired skew is passed to digital to analog converters 130 having outputs connected through RF drivers to the IQ modulator under test 100. This is not needed for factory calibration (before the product is sold), but is required for Tx self-calibration (after the produce is deployed in the field).

The provided approach recovers coherent signals from a photodetector signal at the transmitter side, without the aid of a coherent receiver, so that a pure transmitter skew calibration can be performed without additional uncertainties introduced by a coherent receiver and two ADCs. This can result in cost reduction for factory calibration: coherent receiver and two ADCs are not required compared to the coherent method. The provided approach does not require changing the phase bias of the IQ modulator under test; the skew is measured at its working condition. The above description provides an example for calibrating Tx IQ skew. Similarly, the above process can be repeated for other impairments, such S21, XY skew.

While the described embodiments have focused on the use of a photodetector instead of a coherent receiver for factory/self-calibration, the same method can be used for measuring/calibrating other transmitter impairments. Examples include:
- IQ quadrature (phase) error measurement
- S21 response calibration/measurement
- XY skew calibration
- Channel skew calibration (for multi-channel systems)
- In-line transmitter impairment monitoring and compensation; and
- Enabling cost-effective digital pre-distortion.

S21 is the frequency response/filter shape of the overall transmitter (all the impairments/distortions from the DAC till the output of modulator output). Since the ideal transmitted data, x, is known, and detected data, y, (distorted version) is available, the frequency response of the transmitter can be determined according to Y(f)/X(f). This information can be obtained using the Wiener filter 154 (or other types of equalizers), since the filter coefficients or the filter spectral shape already contain the frequency response of the transmitter.

Figure 2A:
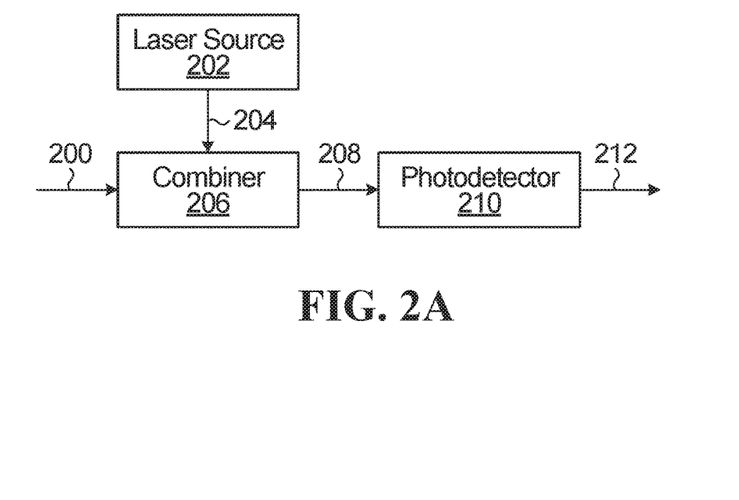
FIGS. 2A and 2B is a schematic of an apparatus for performing coherent detection, and single-channel impairment estimation and calibration.

FIG. 2A is a block diagram of apparatus for detecting a coherent QAM optical signal 200 produced by an IQ modulator. The apparatus has a laser source 202 for generating an optical frequency tone 204 having a carrier frequency outside a bandwidth of the coherent QAM optical signal 200. Note that this laser source 202 can be a fixed one, or a tunable source. A combiner 206, such as an optical coupler, adds the optical frequency tone 204 to the coherent QAM optical signal 200, to produce a coherent QAM optical signal with added optical frequency tone 208. A single photodetector 210 for performs photodetection on the coherent QAM optical signal with added optical frequency tone 208 to produce a photodetector output 212 containing a DC term, a signal beat term, and a signal-signal beat interference (SSBI) term. Following the photodetector 210, an ADC converts the photodetector output 212 to a digitized photodetector output. A DSP, which may be a relatively slow DSP, for example much smaller than the symbol rate, performs processing on the digitized photodetector output. Part of the signal may be saved in memory such that the slow DSP can analyze the saved signal instead of using a chip such as an ASIC to perform real time processing. Examples of processing include determining an estimate of IQ skew, S21, XY skew, and channel skew (for a superchannel system).

Figure 2B:
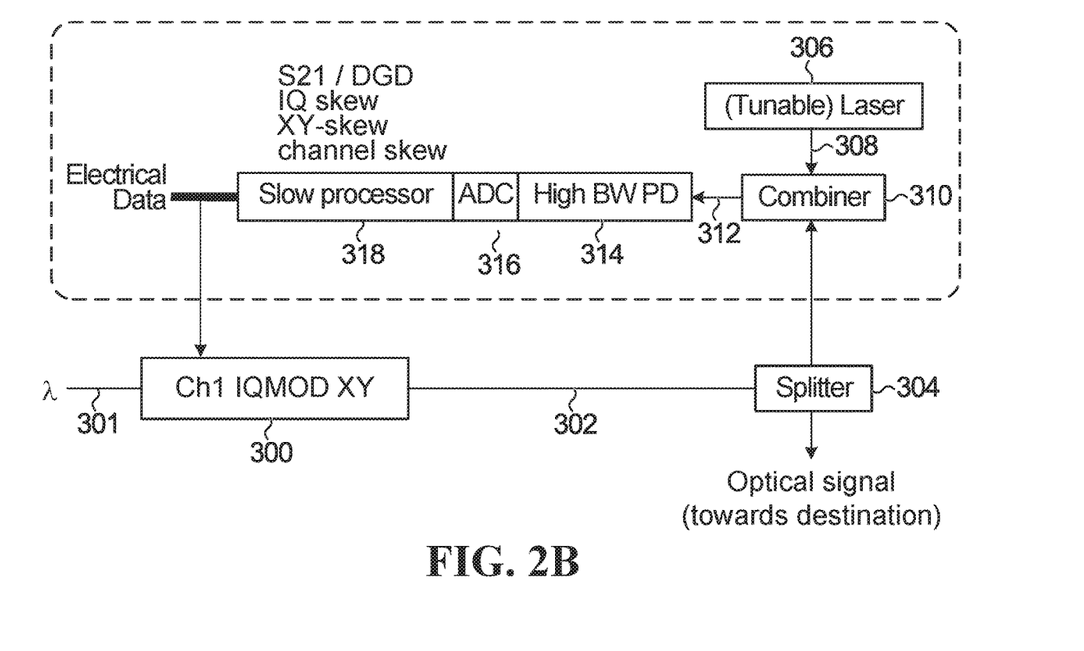

Another embodiment is depicted in FIG. 2B. A single channel IQ modulator is depicted at 300 which receives a wavelength input at 301 and produces a coherent QAM signal 302. A portion is split off in splitter 304. The apparatus has a laser source 306 (illustrated as a tunable laser) for generating an optical frequency tone 308 having a carrier frequency outside a bandwidth of the coherent QAM optical signal 302. A combiner 310, such as an optical coupler, adds the optical frequency tone 308 to the portion of the coherent QAM optical signal, to produce a coherent QAM optical signal with added optical frequency tone 312. A single high bandwidth photodetector 314 for performs photodetection on the coherent QAM optical signal with added optical frequency tone 312 to produce a photodetector output containing a DC term, a signal beat term, and a signal-signal beat interference (SSBI) term. Following the photodetector 314, an ADC 316 converts the photodetector output to a digitized photodetector output. A DSP 318, which may be a relatively slow DSP, performs processing on the digitized photodetector output. Examples of processing include determining an estimate of IQ skew, S21, XY skew, and channel skew (for a superchannel system).

The laser 306 can be a fixed laser source or a tunable one. For a single carrier system, a laser source with a fixed wavelength can be used. For a superchannel system (multiple optical carriers/combining a group of single-carrier signals together), a tunable laser source is used.

Figure 5A:
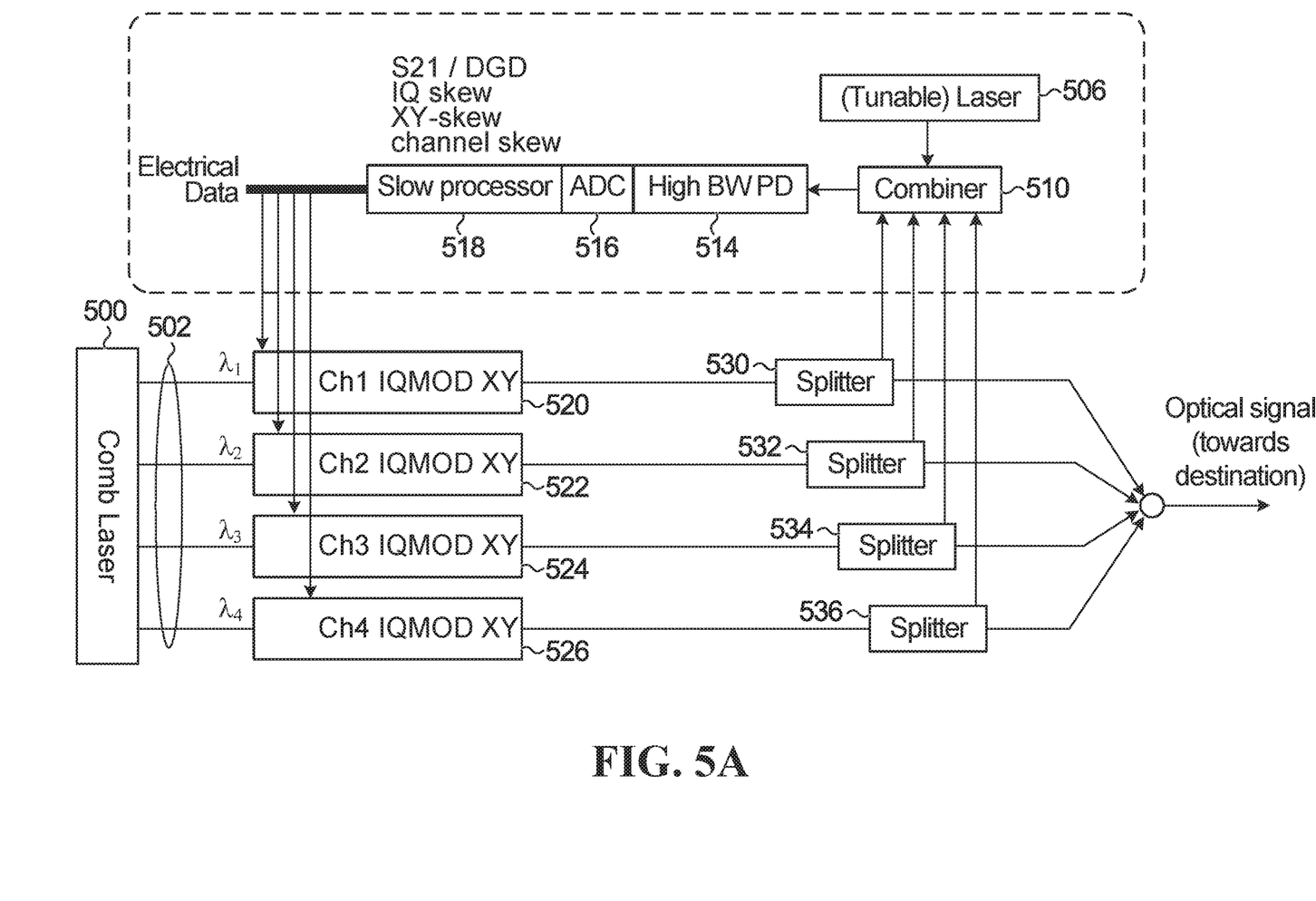
FIG. 5A is a schematic of an apparatus for performing coherent multi-channel optical signal detection, and channel impairment estimation and calibration.

A variant of the FIG. 2B embodiment for a super channel application is depicted in FIG. 5A. Multiple single channel IQ modulators 520,522,524,526 receive respective wavelengths from a set of wavelengths 502 output by a comb laser 500 and produce respective coherent QAM signals. A portion of each coherent QAM signal is split off in splitters 530,532,534,536. A tunable laser 506 for generates an optical frequency tone having a carrier frequency outside a bandwidth of the coherent QAM optical signals. A combiner 510, such as an optical coupler, adds the optical frequency tone to the portions of the coherent QAM optical signals, to produce a coherent multi-channel QAM optical signal with added optical frequency tone. A single high bandwidth photodetector 514 for performs photodetection on the coherent multi-channel QAM optical signal with added optical frequency tone to produce a photodetector output. Following the photodetector 514, an ADC 516 converts the photodetector output to a digitized photodetector output. A DSP 518, which may be a relatively slow DSP, performs processing on the digitized photodetector output. The apparatus of FIG. 5A can be used to determine an estimate of IQ skew, S21, XY skew, on a per channel basis, and can also be used to estimate channel skew, which is the skew between the two neighbouring channels, for example between ch1 (first channel) and ch2 (second channel), between ch2 and ch3 (third channel), between ch3 and ch4 (fourth channel). Take the example of estimating the time delay between ch1 and ch2. When the equipment is powered on, or in its self-calibration mode, the frequency of the tunable laser is shifted to the middle between carrier frequencies $f_{ch1}$ and $f_{ch2}$ of the first and second channels. Two known training sequences are loaded into channel 1 and channel 2, but with different frequency shift from their center frequencies, as depicted in FIG. 5B at 550.

Figure 5B:
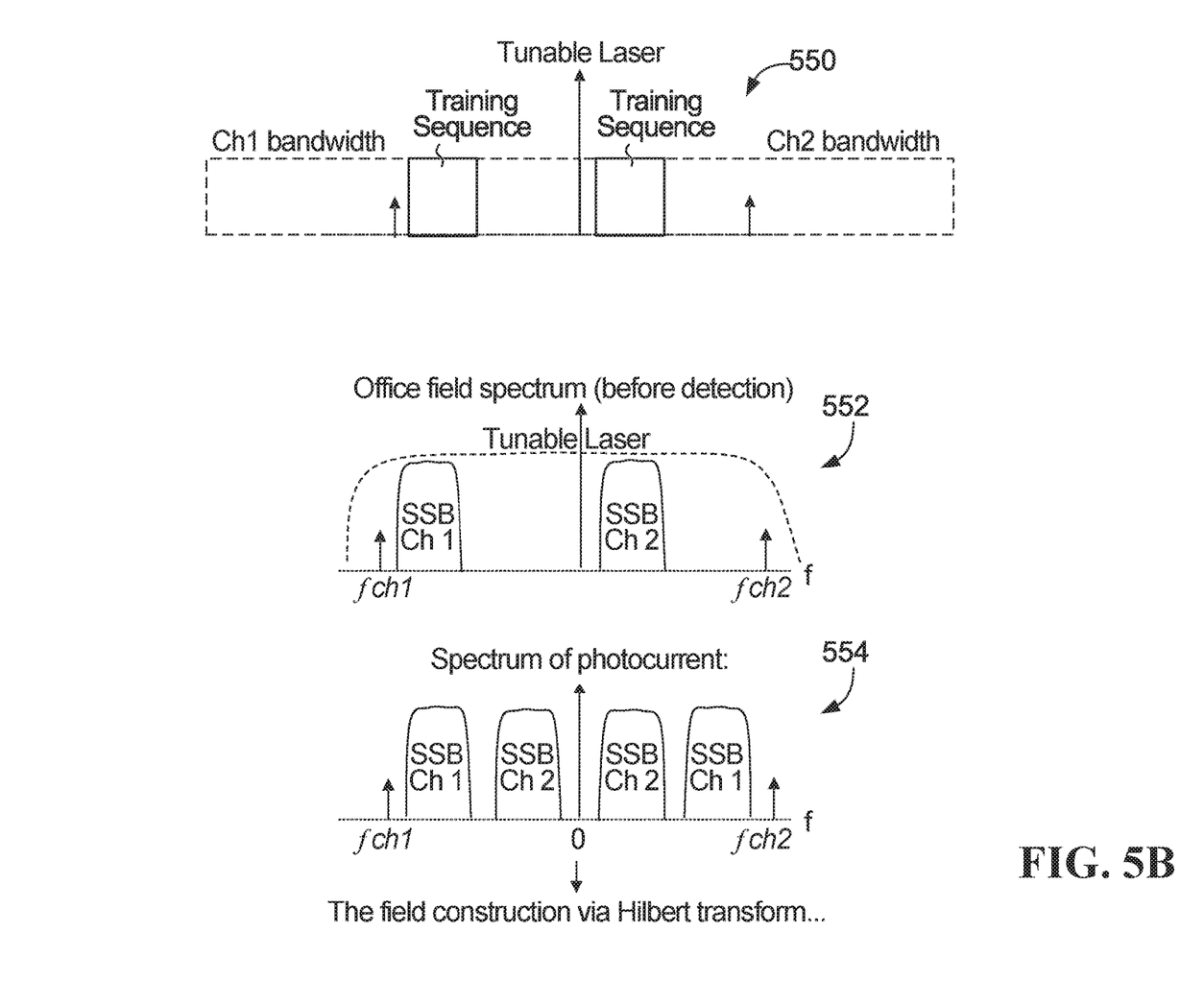
FIGS. 5B and 5C shows a frequency spectrum after various steps performed using the apparatus of FIG. 5A.

The spectrum before photodetection is indicated at 552 in FIG. 5B. The spectra are designed so that, after the photodetection, the mirror image of channel 2 (channel 1) does not overlap the training sequence spectrum of channel 1 (channel 2). This is depicted at 554 in FIG. 5B.

Figure 5C:
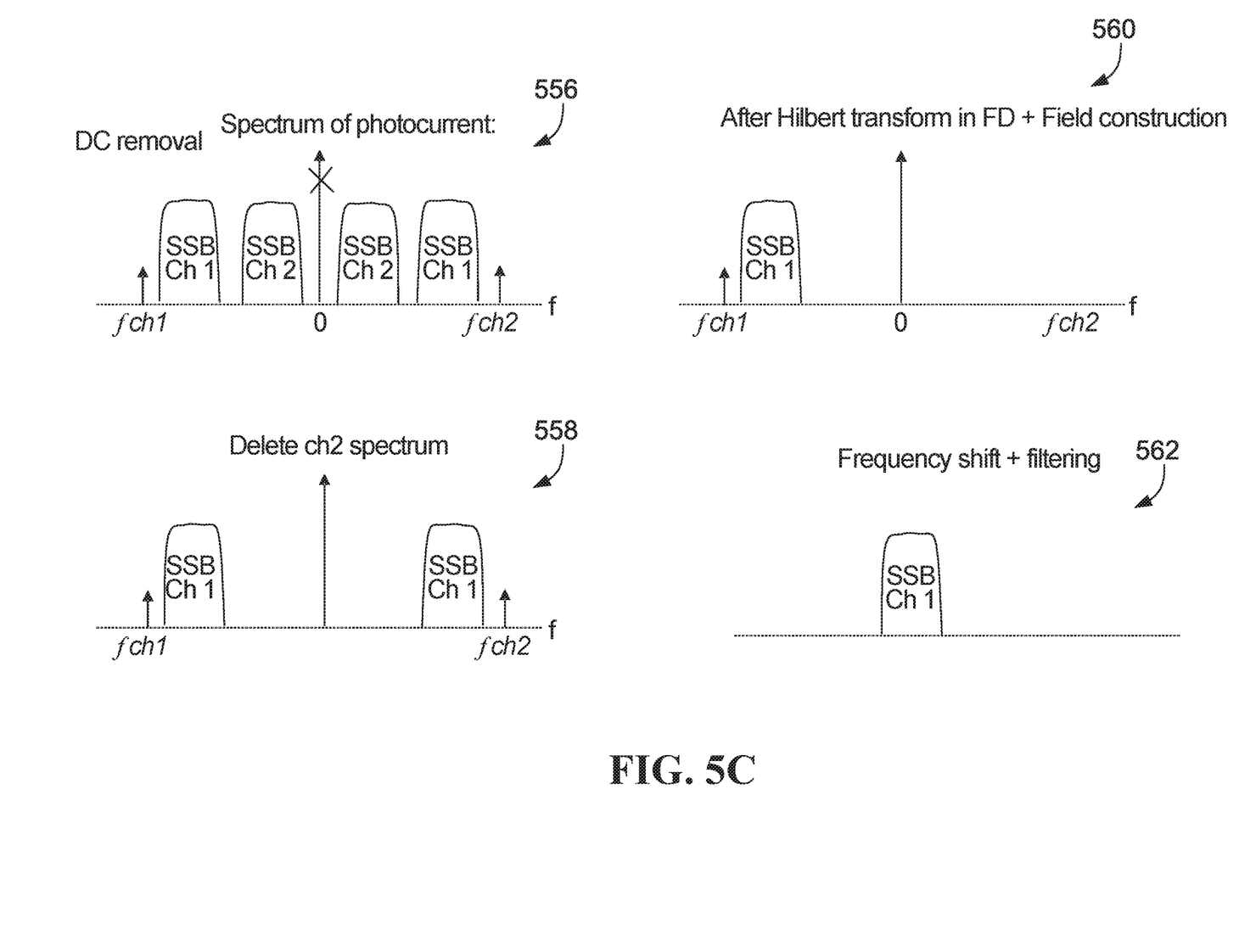

Then similar to the single carrier system, in frequency domain of the photocurrent, first the DC term is removed. The spectrum following DC removal is shown at 556 in FIG. 5C. To recover the channel 1's training sequence, suppress/delete the spectrum of channel 2. The resulting spectrum is shown at 558 in FIG. 5C. Using Hilbert transformation, field construction the spectrum at 560, shown in FIG. 5C, is recovered, and following frequency shift and filtering the spectrum shown at 562 in FIG. 5C. Now, the training sequence of channel 1 is recovered. By repeating the above steps, channel 2 can be recovered. Since the training sequences are known, a simple correlation between the training sequences and the recovered training sequences from the above steps can be used to obtain the channel skew.

The process can be repeated to estimate the skew between channel 2 and channel 3, and between channel 3 and channel 4. The above three channel skews are fed back to as electrical data for adjustment, which is in the process of self-calibration of a superchannel transmitter.

Figure 3:
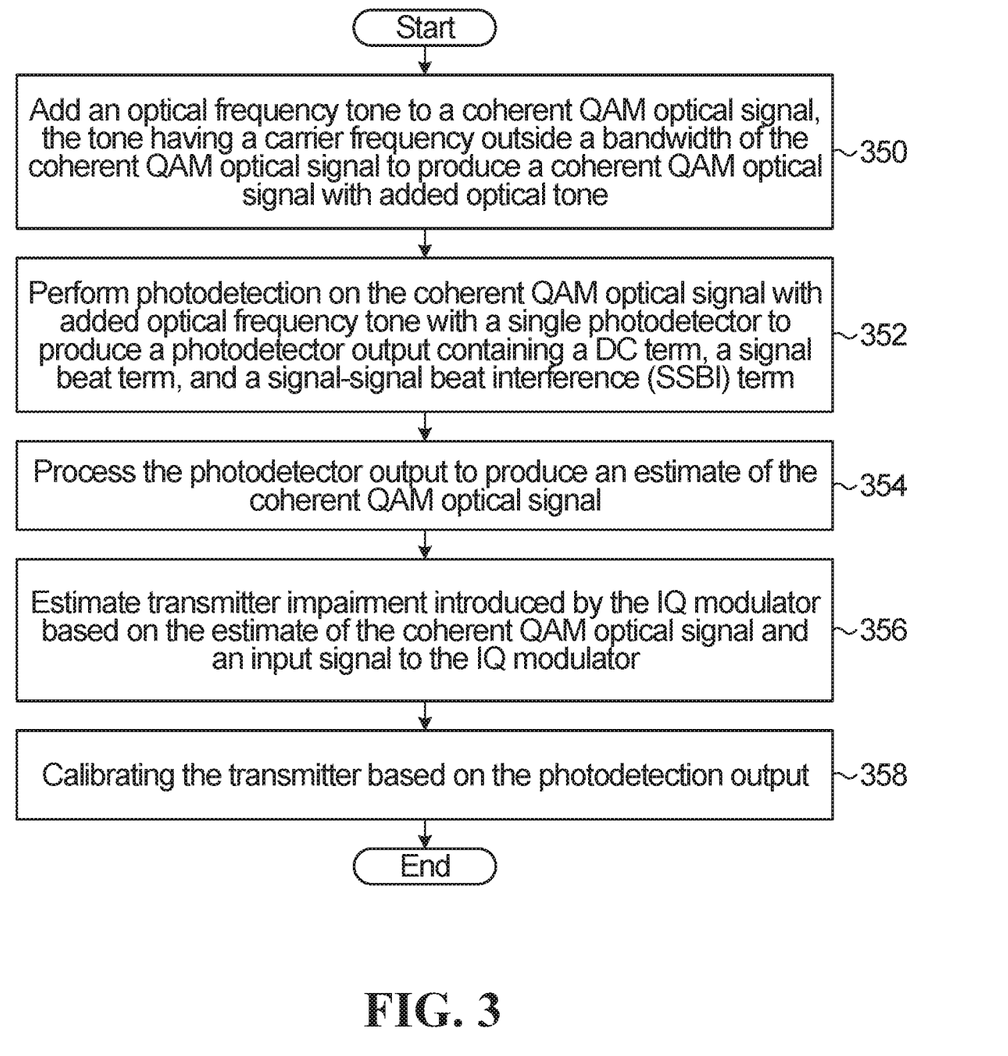
FIG. 3 is a flowchart of a method of performing coherent detection.

Referring now to FIG. 3, shown is a flowchart of a method of detecting a coherent QAM optical signal. The method being in block 350 with adding an optical frequency tone to a coherent QAM optical signal, the tone having a carrier frequency outside a bandwidth of the coherent QAM optical signal to produce a coherent QAM optical signal with added optical frequency tone. The method continues in block 352 with performing photodetection on the coherent QAM optical signal with added optical frequency tone with a single photodetector to produce a photodetector output containing a DC term, a signal beat term, and a signal-signal beat interference (SSBI) term. The method continues in block 354 with processing the photodetector output to produce an estimate of the coherent QAM optical signal (the recovered coherent QAM signal). The method also includes block 356 which involves estimating one or more transmitter impairments introduced by the IQ modulator (or more generally the transmitter) based on the estimate of the coherent QAM optical signal and an input signal to the IQ modulator. The method includes step 358 which involves calibrating the transmitter based on the photodetector output, for example, based on the estimated channel impairment(s). This can involve for a single channel optical signal, calibrating one or a combination of:
  calibrating an S21 response;
  calibrating IQ skew;
  calibrating XY polarization skew.

In the superchannel case, the above calibrations can be performed on a per channel basis, and also the delay between the channels can be calibrated.

Figure 4:
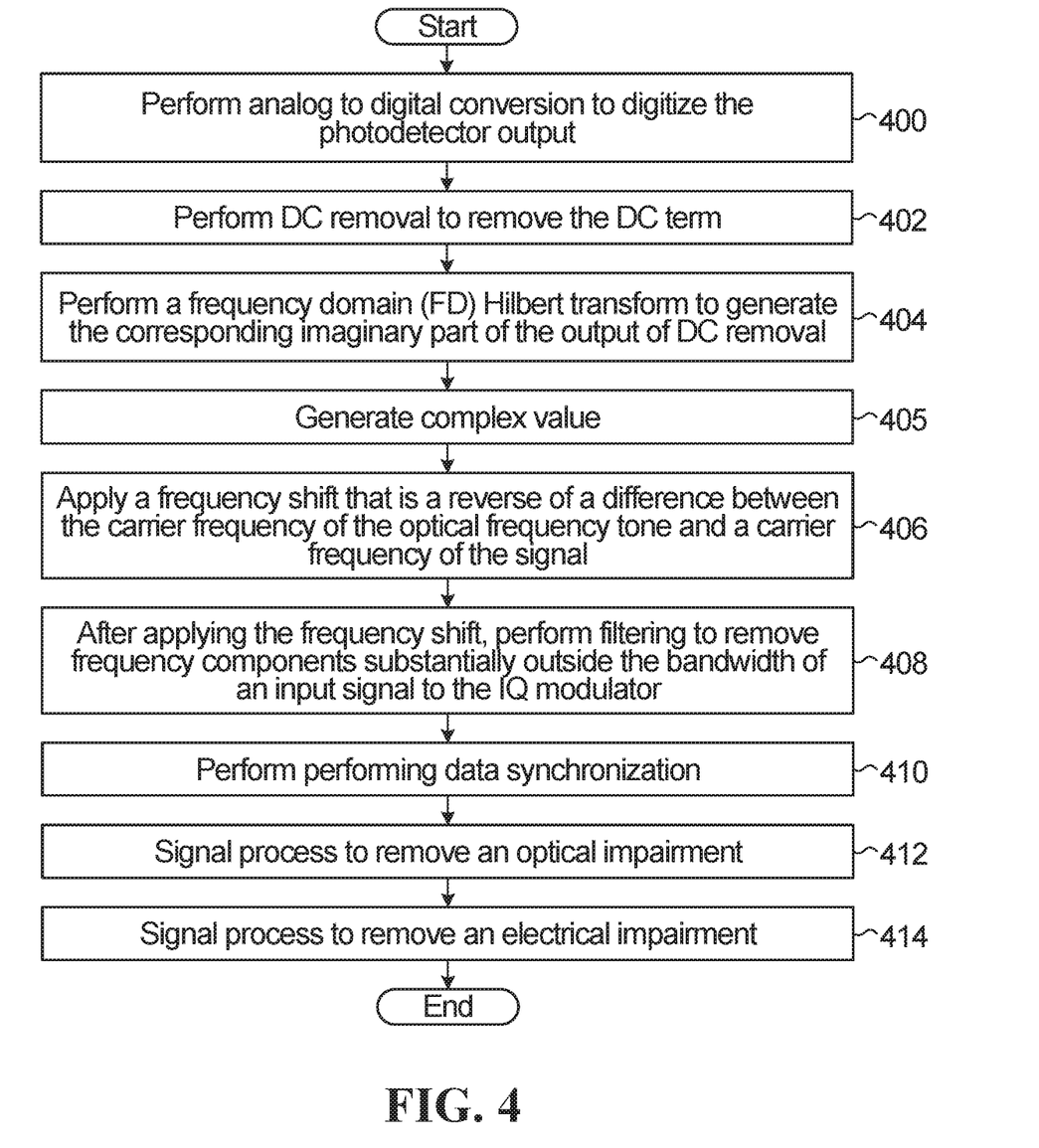
FIG. 4 is a flowchart of a method of processing the photodetector output to produce an estimate of a coherent QAM optical signal.

Referring now to FIG. 4, shown is a flowchart of a method of processing the photodetector output to produce an estimate of the coherent QAM optical signal. The method begins in block 400 with performing analog to digital conversion to digitize the photodetector output. The method continues in block 402 with performing DC removal to remove the DC term to produce an output of DC removal. The method continues in block 404 with performing a frequency domain (FD) Hilbert transform on the output of DC removal to obtain a corresponding imaginary component of the output of DC removal. The method continues in block 405 with generating a complex value having a real component equal to the output of DC removal, and an imaginary component produced by the FD Hilbert transform. The method continues in block 406 with applying a frequency shift that is a reverse of a difference between the carrier frequency of the optical frequency tone and a carrier frequency of the signal.

Various optional blocks 408,410,412,414 follow block 406 to improve the quality of the signal. Block 408 involves, after applying the frequency shift, performing filtering to remove frequency components outside the bandwidth of an input signal to the IQ modulator. The method continues in block 410 with performing data synchronization. The method continues in block 412 with signal processing to remove an optical impairment. The method continues in block 414 with signal processing to remove an electrical impairment.

Numerous modifications and variations of the present disclosure are possible in light of the above teachings. It is therefore to be understood that within the scope of the appended claims, the disclosure may be practiced otherwise than as specifically described herein.

The invention claimed is:

1. A method of calibrating a coherent transmitter, the method comprising:
   optically coupling an optical frequency tone to a coherent QAM optical signal, the tone having a carrier frequency outside a bandwidth of the coherent QAM optical signal to produce a coherent QAM optical signal with added optical frequency tone, such that there is a gap between the bandwidth of the coherent QAM optical signal and the frequency of the optical frequency tone;
   performing photodetection on the coherent QAM optical signal with added optical frequency tone with a single photodetector to produce a photodetector output containing a DC term, a signal beat term, and a signal-signal beat interference (SSBI) term;
   calibrating the transmitter based on the photodetector output.

2. The method of claim 1 wherein calibrating the transmitter output based on the photodetector output comprises:
   for a single channel optical signal, calibrating for one or a combination of the following transmitter impairments;
   an overall transmitter frequency response; or
   IQ skew; or
   XY polarization skew;
   or
   for a superchannel system calibrating one or a combination of the following transmitter impairments:
   an overall frequency response; or
   IQ skew; or
   XY polarization skew; or
   delay between adjacent channels.

3. The method of claim 1 further comprising:
   processing the photodetector output to produce an estimate of a coherent QAM signal from the photodetector output.

4. The method of claim 2 further comprising:
   processing the photodetector output to produce an estimate of the one or a combination of transmitter impairments.

5. The method of claim 4 wherein calibrating the transmitter comprises:
   determining whether or not to discard an IQ modulator forming part of the transmitter based on whether the estimated skew is above a threshold.

6. The method of claim 4 wherein calibrating the transmitter comprises:
   calibrating the transmitter based on the estimate of the one or a combination of transmitter impairments.

7. The method of claim 1 further comprising:
   performing in-line transmitter impairment monitoring and compensation based on the photodetector output.

8. The method of claim 3 wherein processing the photodetector output to produce an estimate of the coherent QAM optical signal comprises:
   performing analog to digital conversion to digitize the photodetector output;
   performing DC removal to remove the DC term to produce a real output of DC removal;
   performing a frequency domain (FD) Hilbert transform on the real output of DC removal to obtain a corresponding imaginary component;
   generating a complex value having a real component equal to the real output of DC removal, and an imaginary component equal to the corresponding imaginary component obtained by the FD Hilbert transform;

applying a frequency shift that is a reverse of a difference between the carrier frequency of the optical frequency tone and a carrier frequency of the signal.

9. The method of claim 8 wherein processing the photodetector output to produce an estimate of the coherent QAM optical signal further comprises:

after applying the frequency shift, performing filtering to remove frequency components outside the bandwidth of an input signal to an IQ modulator forming part of the transmitter;

performing data synchronization.

10. The method of claim 9 wherein processing the photodetector output to produce an estimate of the coherent QAM signal further comprises one or both of:

signal processing to remove an optical impairment;
signal processing to remove an electrical impairment.

11. An apparatus for calibrating a transmitter that has an IQ modulator that produces a coherent QAM optical signal, the apparatus comprising:

a laser source for generating an optical frequency tone having a carrier frequency outside a bandwidth of the coherent QAM optical signal, such that there is a gap between the bandwidth of the coherent QAM optical signal and the frequency of the optical frequency tone;

a combiner for adding the optical frequency tone to the coherent QAM optical signal, to produce a coherent QAM optical signal with added optical frequency tone; and a single photodetector for performing photodetection on the coherent QAM optical signal with added optical frequency tone to produce a photodetector output containing a DC term, a signal beat term, and a signal-signal beat interference (SSBI) term;

a digital signal processor (DSP) configured to calibrate the transmitter based on the photodetector output.

12. The apparatus of claim 11 wherein the DSP is configured to calibrate the transmitter output based on the photodetector output by:

for a single channel optical signal, calibrating for one or a combination of the following transmitter impairments:

an overall transmitter frequency response; or
IQ skew; or
XY polarization skew; or for a superchannel system calibrating one or a combination of the following transmitter impairments:

an overall frequency response; or
IQ skew; or
XY polarization skew; or
delay between adjacent channels.

13. The apparatus of claim 11 further configured to:
process the photodetector output to produce an estimate of a coherent QAM signal from the photodetector output.

14. The apparatus of claim 13 further configured to:
processing the photodetector output to produce an estimate of the one or a combination of transmitter impairments.

15. The apparatus of claim 14 configured to calibrating the transmitter by:

determining whether or not to discard an IQ modulator forming part of the transmitter based on whether the estimated skew is above a threshold.

16. The apparatus of claim 14 configured to calibrate the transmitter by:

calibrating the transmitter based on the estimate of the one or a combination of transmitter impairments.

17. The apparatus of claim 11 further configured to:
perform in-line transmitter impairment monitoring and compensation based on the photodetector output.

18. The apparatus of claim 13 configured to process the photodetector output to produce an estimate of the coherent QAM optical signal by:

performing analog to digital conversion to digitize the photodetector output;

performing DC removal to remove the DC term to produce a real output of DC removal;

performing a frequency domain (FD) Hilbert transform on the real output of DC removal to obtain a corresponding imaginary component;

generating a complex value having a real component equal to the real output of DC removal, and an imaginary component equal to the corresponding imaginary component obtained by the FD Hilbert transform;

applying a frequency shift that is a reverse of a difference between the carrier frequency of the optical frequency tone and a carrier frequency of the signal.

19. The apparatus of claim 18 further configured to process the photodetector output to produce an estimate of the coherent QAM optical signal by:

after applying the frequency shift, performing filtering to remove frequency components outside the bandwidth of an input signal to an IQ modulator forming part of the transmitter;

performing data synchronization.

20. The apparatus of claim 19 configured to process the photodetector output to produce an estimate of the coherent QAM optical signal further by one or both of:

signal processing to remove an optical impairment;
signal processing to remove an electrical impairment.

* * * * *